United States Patent [19]

Maritsch

[11] 4,144,125
[45] Mar. 13, 1979

[54] RUPTURE PROTECTION DEVICE FOR HOLLOW CYLINDRICAL MEMBERS SUCH AS PIPES, AND PARTICULARLY FOR PIPES OF NUCLEAR REACTORS CARRYING PRIMARY COOLANT

[75] Inventor: Franz Maritsch, Erlangen, Fed. Rep. of Germany

[73] Assignee: Kraftwerk Union Aktiengesellschaft, Mülheim, Fed. Rep. of Germany

[21] Appl. No.: 725,524

[22] Filed: Sep. 22, 1976

[30] Foreign Application Priority Data

Sep. 25, 1975 [DE] Fed. Rep. of Germany ....... 2542807

[51] Int. Cl.² .......................... G21C 9/00; F16L 9/04
[52] U.S. Cl. ...................................... 176/38; 138/172; 176/87
[58] Field of Search .................... 176/38, 87; 138/155, 138/172, 157, 167

[56] References Cited

U.S. PATENT DOCUMENTS

| 1,529,719 | 3/1925 | Romeyn | 138/155 |
| 2,355,336 | 8/1944 | Shafer | 138/172 |
| 3,930,943 | 1/1976 | Michel et al. | 176/87 |
| 4,036,700 | 7/1977 | Dorner | 176/87 |

FOREIGN PATENT DOCUMENTS

| 272664 | 3/1951 | Switzerland | 138/155 |
| 12849 of | 1884 | United Kingdom | 138/155 |

*Primary Examiner*—Samuel W. Engle
*Assistant Examiner*—Ralph Palo
*Attorney, Agent, or Firm*—Herbert L. Lerner

[57] ABSTRACT

Rupture protection device for hollow cylindrical members having, in installed condition thereof, respective projections at the axial ends thereof protruding beyond the diameter thereof and forming axial stops, includes a plurality of rings serially connectible to one another in axial direction of a hollow cylindrical member and slideable onto the hollow cylindrical member together with at least one divided filler ring so as to form a closed ring unit covering the hollow cylindrical member, the rings being formed with respective overlapping zones at adjoining end face regions thereof constituting respective encircling projections and recesses complementary thereto in mutual engagement and respectively overlying and underlying one another, the filler ring being at least bipartite and formed with both end face regions thereof having encircling projections overlying respective recesses formed in the rings adjoining the filler ring so as to facilitate insertion of the filler ring radially on a hollow cylindrical member, and a locking ring axially slideable on the ring unit including the filler ring for securing the parts of the filler ring in installed condition thereof on a hollow cylindrical member, the locking ring being seatingly mounted with matching fit on the outer periphery of the filler ring.

8 Claims, 6 Drawing Figures

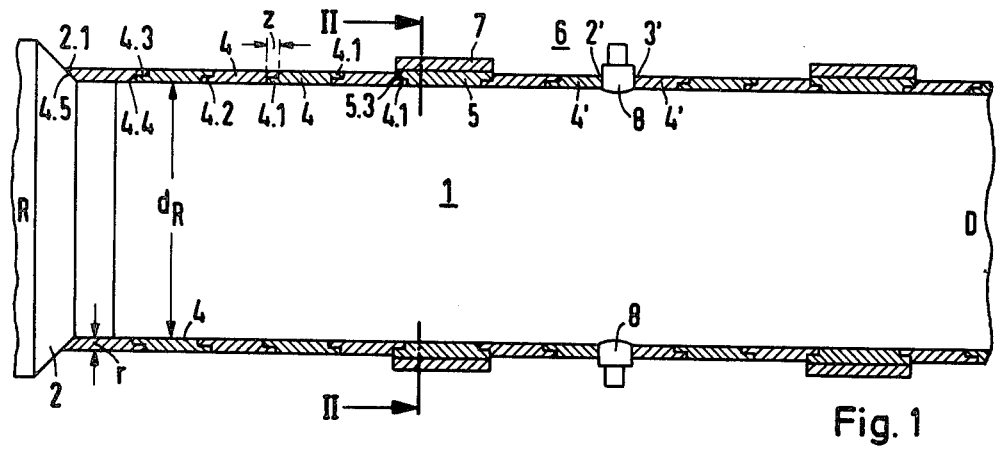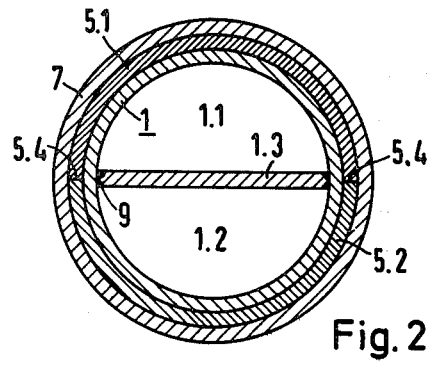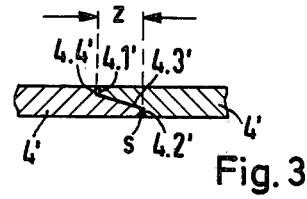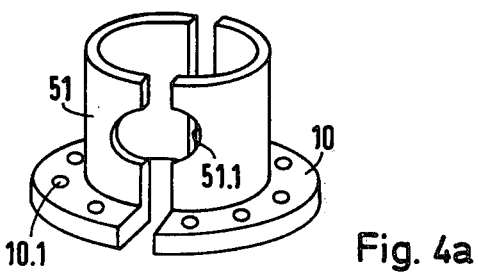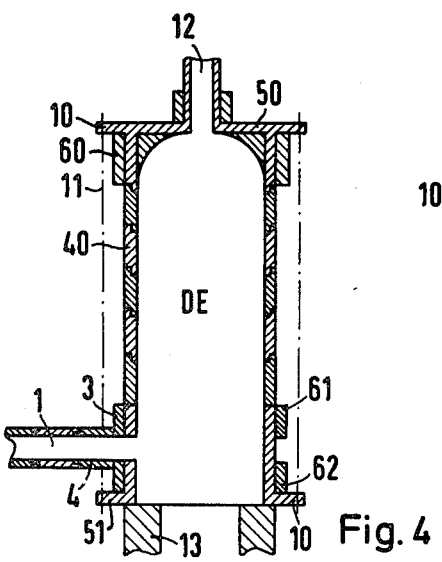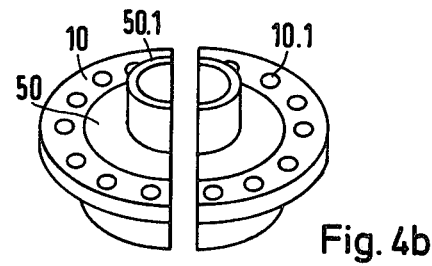
Fig. 1
Fig. 2
Fig. 3
Fig. 4a
Fig. 4b
Fig. 4

RUPTURE PROTECTION DEVICE FOR HOLLOW CYLINDRICAL MEMBERS SUCH AS PIPES, AND PARTICULARLY FOR PIPES OF NUCLEAR REACTORS CARRYING PRIMARY COOLANT

The invention relates to a rupture protection device for hollow cylindrical members such as pipes and, especially, for pipes of nuclear reactors carrying primary reactor coolant, and wherein, in the installed condition, the hollow cylinder or pipe section to be protected is respectively defined by projections at the ends thereof, such as connector tubes, flanges or the like, which protrude beyond the diameter of the hollow cylinder and form axial stops.

Such a device has become known heretofore from German Published Nonprosecuted Application DT-OS No. 2 258 226, and especially FIG. 6 thereof, wherein a reactor primary coolant line running between the reactor pressure vessel and the steam generator is provided at the periphery thereof with ring segments of pressure-tight-isolating concrete, and individual steel rings, which are disposed at a predetermined spacing from one another, are slid over the ring segments. In addition, external tie rods are provided, by which the reactor pressure vessel and the steam generator are connected one to the other in longitudinal direction of the pipe. With such a rupture protection device for pipes, it may happen that, in the event circular cracks are formed, the two pipe ends may become offset from one another and, in the event of a rupture, the outflow cross sections become only partially limited. In addition, the outer surface of the pipe is no longer fully accessible for subsequent in-service inspections.

It is accordingly an object of the invention to provide for hollow cylindrical members such as pipes of the hereinaforementioned type a rupture protection device which is improved over these employed heretofore and which provides effective rupture protection if circular or longitudinal cracks should occur; which covers the entire pipe surface; and with which, nevertheless, practically 100% accessibility to all points of the pipe surface for in-service tests is provided.

With the foregoing and other objects in view, there is provided, in accordance with the invention, a rupture protection device for hollow cylindrical members having, in installed condition thereof, respective projections at the axial ends protruding beyond the diameter thereof and forming axial stops comprising a plurality of rings serially connectible to one another in axial direction of a hollow cylindrical member and slideable onto the hollow cylindrical member together with at least one divided filler ring so as to form a closed ring unit covering the hollow cylindrical member, the rings being formed with respective overlapping zones at adjoining end face regions thereof constituting respective encircling projections and recesses complementary thereto in mutual engagement and respectively overlying and underlying one another, the filler ring being at least bipartite and formed with both end face regions thereof having encircling projections overlying respective recesses formed in the rings adjoining the filler ring so as to facilitate insertion of the filler ring radially on a hollow cylindrical member, and a locking ring axially slideable on the ring unit including the filler ring for securing the parts of the filler ring in installed condition therof on a hollow cylindrical member, the locking ring being seatingly mounted with matching fit on the outer periphery of the filler ring.

The advantages attainable with the rupture protection device of the invention are to be seen primarily in that because of the mutually engaging steps at the end faces of the rings and the gapless joints between the pipe ends, a virtually tight second pipe is obtained which, in the event of a rupture, also prevents the pipe ends from shifting or becoming offset and permits only very little outflow. The locking ring can be moved axially so as to expose the divided filler ring. The ring segments of the divided filler ring can be removed, so that a gap is laid open. By appropriately shifting the rupture protection rings, the entire outer pipe surface can now be exposed successively for inspection or the like.

In accordance with another feature of the invention, the rings are formed with respective step-shaped projections and respective recesses complementary thereto, the projections having cylindrical and radial fitting surfaces for alternating mutual engagement of adjoining rings. Such a projection-and-recess form ensures good manufacturability, ease assembly and a given amount of axial thermal expansion during operation.

In accordance with a further feature of the invention, the step-shaped projections and recesses have a step depth that is substantially one-half the wall thickness of the rings, so that all the rings have the same strength.

In accordance with an added feature of the invention, the filler ring is axially divided into at least two parts.

If the adjoining rings are to be braced with a defined force against one another in the contact region therebetween during operation, it is advisable, in accordance with an additional feature of the invention, to form the rings with respective conical downwardly tapering projections and respective recesses complementary thereto, the mutually adjoining rings being in mutual engagement through the respective conical surfaces accordingly provided at the outer and inner peripheries of the overlapping zones thereof.

In accordance with yet another feature of the invention, the respective end rings of the assembled ring unit adjoining the respective axial stops have contact surfaces formlockingly engaging the axial stops.

In accordance with concomitant and alternate features of the invention, the hollow cylindrical member is a pipe or a pressure vessel. In this regard the pressure vessel may be of the type containing a steam generator therewithin.

Other features which are considered as characteristic for the invention are set forth in the appended claims.

Although the invention is illustrated and described herein as embodied in rupture protection device for hollow cylindrical members such as pipes, and particularly for pipes of nuclear reactors carrying primary coolant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 1 is an axial cross-sectional view of an embodiment of the rupture protection system according to the invention for a pipeline, in this case a reactor coolant line, shown in full axial view i.e. not in section, which is connected to a non-illustrated reactor pressure vessel at the left-hand side of the figure and to a non-illustrated steam generator at the right-hand side of the figure;

FIG. 2 is a cross-sectional view of FIG. 1 taken along the line II—II in the direction of the arrows;

FIG. 3 is an enlarged fragmentary view of FIG. 1 showing the engagement region of two mutually adjoining rings modified with conical fitting surfaces.

FIGS. 4, 4a and 4b further show diagrammatically the application of the rupture protection system to a steam generator;

FIG. 4 being a diagrammatic longitudinal sectional view of a steam generator in outline form showing primary and secondary lines therefor and a rupture protection enclosure or covering according to the invention;

FIG. 4a being an enlarged fragmentary perspective view of FIG. 4 showing a divided filling ring for the region of the primary line of the steam generator; and FIG. 4b being similarly an enlarged fragmentary perspective view of FIG. 4 showing a divided filling ring for the region of the live steam line of the steam generator.

Referring now to the drawing and first, particularly, to FIG. 1 thereof, there is shown a rupture protection device provided for a pipe 1 of a nuclear power plant, which transports primary reactor coolant from the reactor side R of the plant back and forth to the steam generator side D of the plant. Since in the case at hand the pipe 1 is a divided pipe with, as shown in FIG. 2, an upper pipe half 1.1 and a lower pipe half 1.2, which are separated from one another by a horizontal partition 1.3 the lower part of the pipe 1.2 constitutes the outgoing pipeline which transports the hot reactor coolant, such as water, especially, from the reactor to the steam generator, and the upper line part 1.1 is the return line which conducts the primary reactor coolant, that has been cooled down in the steam generator, back to the reactor. The primary coolant is pumped by means of non-illustrated reactor coolant pumps, which may be structurally united with the steam generator DE (see FIG. 4). The pipe length 1 which is to be protected is limited or defined in the installed condition by projections 2 and 3 at the ends thereof, which protrude beyond the outer diameter $d_R$ of the pipe length 1 and form axial stops. The stop 2 is formed by a conical radial enlargement of the pipe; the stop 3 is not visible in FIG. 1 but can be seen in FIG. 4, however, where it is formed by a rupture protection ring of the steam generator DE.

According to the invention, rings 4 serially disposed in axial direction of the pipe section 1 and slid onto and over the pipe section 1, as well as at least one divided filler ring 5 having ring parts 5.1 and 5.2 produce for the pipe section 1 a closed ring unit 6 which covers up the pipe section 1. To this end, the rings 4 are each provided, within an overlap zone z of adjoining end face regions thereof, with encircling projections 4.1 and recesses 4.2 complementary thereto. The projections 4.1 of the rings 4 mutually engage and overlie and underlie one another as seen in particular, in FIG. 1. To facilitate the insertion of the filler ring 5 radially, it is constructed as an overlying or overengaging ring with corresponding overlying projections 5.3 i.e. both projections 4.1 of the adjoining rings 4 at both sides thereof underlie the porjections 5.3. The parts 5.1, 5.2 of the filler ring 5 are then securable in the inserted position thereof by a locking ring 7, which is axially shiftable on the ring unit 6 including the filler ring 5 and is seatingly mounted with a matching fit on the outer periphery of the filler ring 5.

As is shown particularly in FIG. 1, the rings 4 and 5 are provided with step-shaped projections and formed with recesses complementary thereto, respectively, the projections 4.1 and 5.3 have cylindrical matching or fitting surfaces 4.3 and radial matching or fitting surfaces 4.4 for the alternatingly mutual engagement of adjoining rings. As is apparent, the depth of the step of the projections 4.1 and of the recesses 4.2 constitutes about one-half of the wall thickness r of the rings. The filler ring 5 is preferably axially divided into two parts (note the axial parting gap 5.4 in FIG. 2). In FIG. 1 there are further shown measured pipeline connectors 8, and in FIG. 2 there are additionally shown welded seams 9 by means of which the partition 1.3 within the pipe 1 is secured to the inner pipe wall surface. It is apparent from FIGS. 1 and 4 that the respective first and last rings 4 of the ring unit 6, that respectively adjoin the axial stops 2 and 3, are constructed so that they form-lockingly engage the axial stops 2 and 3 by the contact surfaces thereof against i.e. the ring 4 adjoining the stop surface 2.1 of the conical pipe enlagrement 2 has a correspondingly conically formed, flush-fitting countersurface 4.5. According to FIG. 4, the stop surfaces 3 and the non-identified countersurface of the ring 4 at the end of the line 1 are planar ring surfaces. Because of the form-locking contact of the rings 4 at the end of the line 1 with the stop surfaces, the rings 4 can be installed without axial play.

FIG. 3 shows a modified embodiment of the invention wherein the rings 4' are provided with conical downwardly tapered projections 4.1' and recesses 4.2' complementary thereto, and the mutually adjoining rings 4' engage one another by means of the respective conical surfaces 4.3' which are provided at the outer and inner periphery, as the case may be, of the overlap zone z thereof, the end surfaces 4.4' extending radially, as in the embodiment of FIG. 1, and having a small gap s to allow for thermal expansion in axial direction.

FIGS. 4, 4a and 4b show the outer enclosure of a steam generator DE, which is surrounded by a rupture protection enclosure constructed in accordance with the invention. The rings 40 of the rupture protection device, are serially connectible in axial direction of the steam generator DE together with an upper filler ring 50, an upper cover ring 60, a lower filler ring 51 and two lower cover rings 61 and 62. The filler rings 50 and 51 are constructed simultaneously as angle rings and have respective flanges 10, in which axial tie rods, particularly bracing or tensioning cables 11, can be anchored. The flanges 10 are provided for this purpose with appropriate bores 10.1. The lower filler ring 51 is divided in two and has corresponding notches or cutouts 51.1 to embrace or encircle the reactor coolant pipe 1. Similarly, the upper filler ring 50 is also provided with notches or cutouts 50.1 for encircling or embracing the live steam line 12. The foundation 13 of the steam generator DE is further shown in FIG. 4. So as to provide an uninterrupted or gapless rupture protection unit, the lines 1 and 12 or FIG. 4 are also to be equipped with a ring unit of the type shown in FIG. 1. Additional stops 2' and 3' are formed by measurement pipeline connectors 8, the adjoining rings thereto having appropriate notches or recesses therefor.

There is claimed:

1. Rupture protection device for hollow cylindrical members having, in installed condition thereof, respective projections at the axial ends thereof protruding beyond the diameter thereof and forming axial stops comprising a plurality of continuous rings serially connectible to one another in axial direction of a hollow cylindrical member and slidable onto the hollow cylindrical member together with at least one divided filler ring so as to form a closed ring unit covering the hollow cylindrical member, said rings being formed with respective overlapping zones at adjoining end face regions thereof constituting respective encircling projections and recesses complementary thereto in mutual engagement and respectively overlying and underlying one another, said filler ring being discontinuous and at least bipartite and being formed with both end face regions thereof having encircling projections overlying respective recesses formed in the rings adjoining said filler ring so as to facilitate insertion and removal of the parts of said filler ring radially on a hollow cylindrical member, and a locking ring axially slideable on said ring unit including said filler ring for securing the parts of said filler ring in installed condition thereof on a hollow cylindrical member, said locking ring being seatingly mounted with matching fit on the outer periphery of said filler ring.

2. Device according to claim 1 wherein said rings are formed with respective stepshaped projections and respective recesses complementary thereto, said projections having cylindrical and radial fitting surfaces for alternating mutual engagement of adjoining rings.

3. Device according to claim 2 wherein said stepshaped projections and recesses have a step depth that is substantially one-half the wall thickness of said rings.

4. Device according to claim 1 wherein said filler ring is axially divided into at least two parts.

5. Device according to claim 1 wherein said rings are formed with respective conical downwardly tapering projections and respective recesses complementary thereto, the mutually adjoining rings being in mutual engagement through the respective conical surfaces accordingly provided at the outer and inner peripheries of the overlapping zones thereof.

6. Device according to claim 1 wherein the respective end rings of the assembled ring unit adjoining the respective axial stops have contact surfaces formlockingly engaging the axial stops.

7. Device according to claim 1 wherein the hollow cylindrical member is a pipe.

8. Device according to claim 1 wherein the hollow cylindrical member is a pressure vessel.

* * * * *